United States Patent Office 2,919,274
Patented Dec. 29, 1959

2,919,274

AMIDINES

John A. Faust and Melville Sahyun, Santa Barbara, Calif.; said John A. Faust assignor to Melville Sahyun, doing business as Sahyun Laboratories, Santa Barbara, Calif.

No Drawing. Application September 17, 1957
Serial No. 684,399

9 Claims. (Cl. 260—251)

The present invention relates to ortho-halobenzyl substituted-cyclic amidines and acid addition salts thereof.

The present invention resides in the concept of certain substituted-cyclic amidines in which there is attached to one of the carbon atoms of the amidine ring, through a single carbon of a lower-alkylene bridge, an aromatic ring halogenated in at least one position ortho to the ring to which the amidine ring is attached, and to a process for preparing such compounds. The physical embodiments of the inventive concept can be made by reacting an ortho-haloaryl acetonitrile with an alkylenediamine to produce a 2-(ortho-chloroaryl)-cyclic amidine.

The physical embodiments of this invention have been evaluated by standard pharmacological testing procedures and demonstrated to possess both enhanced and prolonged adrenolytic and sympatholytic pharmacological activity in experimental animals, compared with the responses elicited by the corresponding non-halogenated substituted cyclic amidines or such compounds halogenated in the meta or para positions.

The free bases of the present invention have the structural formula:

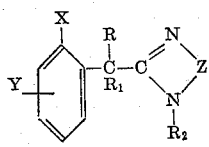

wherein:

Y represents hydrogen or a halogen;
X represents a halogen;
R represents hydrogen, lower-alkyl, or hydroxy;
$R_1$ represents hydrogen or lower-alkyl;
$R_2$ represents hydrogen or lower-alkyl;
Z represents $CH_2CH_2CH_2$ or $CH_2CH_2$ wherein a hydrogen may be replaced by a lower-alkyl or a hydroxy radical All the free bases of this invention, except those in which R in the above structural formula is hydroxy, may be prepared as follows:

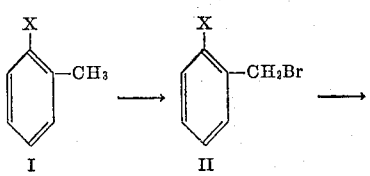

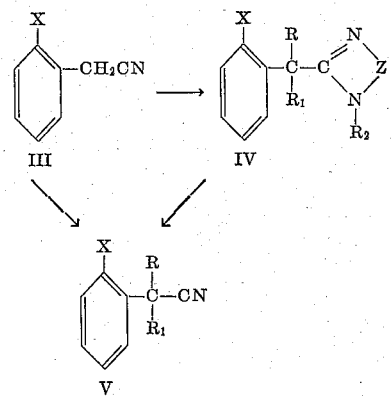

Halo-toluenes (I), which are commercially available, are halogenated by customary methods to the halo-benzyl halides (II), which are known compounds. The crude halides (II) are converted into nitriles (III) by use of alkali metal cyanide. The nitriles (III) are then converted to the heterocycles (IV) by reaction at about 200 degrees centigrade with an alkylene diamine salt p-toluenesulfonate (either mono- or bis-) in the general manner described in the literature in J. Chem. Soc., 1947, 497. The nitriles (III) may be alkylated with alkyl halides in the presence of sodium amide to form the substituted nitriles (V), which are then converted to the heterocycles (IV).

The free bases of this invention wherein the R is hydroxy are prepared by converting o-chlorobenzaldehyde to o-chloromandelonitrile, which is then treated with alcohol in ether containing an excess of hydrogen chloride to form an imidic ester hydrochloride, e.g. ethyl-o-chloromandelimidate hydrochloride, which is in turn reacted with a diamino lower alkane. This type of synthesis is illustrated by Example 13.

The free base compounds of this invention may be converted to the corresponding acid addition compounds of any of the usual acids substantially non-toxic to animal organisms such as the hydrogen halide acids and other strong mineral acids, the aliphatic acids, aromatic acids and heterocyclic acids.

Of the hydrogen halide acids, hydrochloric, hydroiodic, hydrobromic and hydrofluoric acids may be used. As illustrative of a strong mineral acid, sulfuric, nitric, and phosphoric, phosphorus and hypophosphoric acids may be used. As examples of aliphatic acids, acetic, lactic, caproic, citric, tartaric, succinic and lauric acids and their halogenated derivatives may be used. As aromatic acids, benzoic and salicyclic are representative. As heterocyclic acids, nicotinic acid and barbituric acid are representative.

The following examples are offered as illustrative of the compounds of the present invention and the processes whereby they may be prepared, and are not to be construed as limiting.

Example 1.—2-(o-chlorobenzyl)imidazoline hydrochloride

A solution of 500 grams (3.1 mole) of commercial alpha, o-dichlorotoluene in 600 milliliters of ethanol was added to a hot, stirred solution of 260 grams (4 moles) of potassium cyanide in 300 milliliters of water over a period of 2 hours. After the mixture had been stirred under reflux for 5 hours, it was filtered to remove the precipitated potassium chloride and the filtrate was distilled to remove most of the alcohol. The residue was partitioned between water and chloroform and the chloroform solution was distilled to obtain 437 grams (88 percent) of colorless product, o-chlorophenylacetonitrile, boiling point 106–111 degrees centigrade (2 millimeters).

A mixture of 7.5 grams (0.05 mole) of o-chlorophenylacetonitrile and 16.2 grams (0.07 mole) of ethylenediamine-mono-p-toluenesulfonate was heated at 200–220 degrees centigrade until the evolution of ammonia had ceased (1 hour). The cooled mixture was dissolved in 75 milliliters of water, the solution was treated with charcoal and made alkaline with sodium hydroxide. The solid base (7.2 grams) was isolated and a sample was recrystallized from heptane to obtain a yellowish needles, 2-(o-chlorobenzyl)imidazoline, melting point, 116–118 degrees centigrade.

*Analysis.*—Calculated for $C_{10}H_{11}ClN_2$: neut. equiv., 195. Found: 198.

The hydrochloride salt was prepared in ethanolic hydrogen chloride and recrystallized from ethanol; melting point 235–236 degrees centigrade.

Example 2.—2-(o-bromobenzyl)imidazoline hydrochloride

Following the procedure of Example 1, but starting with o-bromophenylacetonitrile, 2-(o-bromobenzyl)-imidazoline hydrochloride was recrystallized from ethanol-ether and obtained as yellowish blade-like crystals readily soluble in water, having a melting point of 246–247 degrees centigrade.

*Analysis.*—Calculated for $C_{10}H_{11}BrN_2 \cdot HCl$: Cl⁻ 12.86. Found: 12.80.

Example 3.—2-(o,p-dichlorobenzyl)imidazoline hydrochloride

Following the procedure of Example 1, but starting with o,p-dichlorophenylacetonitrile, 2-(o,p-dichlorobenzyl)imidazoline hydrochloride was recrystallized from isopropanol-ether and obtained as a slightly salmon-colored crystalline solid, readily soluble in water, having a melting point of 197–198 degrees centigrade.

*Analysis.*—Calculated for: $C_{10}H_{10}Cl_2N_2 \cdot HCl$: Cl⁻ 13.35. Found: 13.47.

Example 4.—2-(o-iodobenzyl)imidazoline hydrochloride

Following the procedure of Example 1, alpha, ortho-iodobenzyl bromide was converted to o-iodophenylacetonitrile, which boils at 112–118 degrees centigrade/1.3–1.5 millimeters. This was reacted with ethylenediamine-mono-p-toluenesulfonate to obtain 2-(o-iodobenzyl)imidazoline, as a solid melting at 100–101 degrees centigrade.

*Analysis.*—Calculated for $C_{10}H_{11}IN_2$: neut. equiv. 286. Found: 283.

The above free base was reacted with ethanolic hydrogen chloride and upon recrystallization from methanol-ether, pale yellow needles of 2-(o-iodobenzyl)imidazoline hydrochloride melting at 272–273 degrees centigrade (decomposition) were obtained.

*Analysis.*—Calculated for $C_{10}H_{11}IN_2 \cdot HCl$: Cl⁻ 10.99. Found: 11.21.

ride

Following the procedure of Example 1, but using o-fluoro-phenylacetonitrile, 2-(o-fluorobenzyl)imidazoline (melting point 90–91 degrees centigrade; boiling point 131–133 degrees centigrade (1.5 millimeters)) was obtained and converted to its acid addition salt. The 2-(o-fluorobenzyl)imidazoline hydrochloride, after recrystallization from ethanol-ether was obtained as a water-soluble, white, crystalline solid, melting at 194–195 degrees centigrade.

*Analysis.*—Calculated for $C_{10}H_{11}FN_2 \cdot HCl$: Cl⁻ 16.52. Found: 16.80.

Example 6.—2-(2,6-dichlorobenzyl)imidazoline hydrochloride

Following the procedure of Examples 1 and 3, but starting with 2,6-dichlorophenylacetonitrile, 2-(2,6-dichlorobenzyl)imidazoline was obtained after recrystallization from dilute methanol as a solid, melting point 185–186 degrees centigrade, and after reacting this base with ethanolic hydrogen chloride, 2-(2,6-dichlorobenzyl)imidazoline hydrochloride was recrystallized from ethanol-ether and obtained in the form of colorless crystals having a corrected melting point of 257–258 degrees centigrade. The compound is soluble in alcohol and water.

*Analysis.*—Calculated for $C_{10}H_{10}Cl_2N_2 \cdot HCl$: Cl⁻ 13.35. Found: 13.57.

Example 7.—2-(o-chlorobenzyl)-1,4,5,6-tetrahydropyrimidine hydrochloride

Following the procedure of Example 1, o-chlorophenylacetonitrile was reacted with 1,3-diaminopropane-bis-p-toluenesulfonate (J. Chem. Soc. 1947, 947). The desired 2-(o-chlorobenzyl)-1,4,5,6-tetrahydropyrimidine hydrochloride, after recrystallization from ethanol-ether, was obtained as water-soluble salmon-colored needles, which melted at 214–215 degrees centigrade.

*Analysis.*—Calculated for $C_{11}H_{13}ClN_2 \cdot HCl$: Cl⁻ 14.46. Found: 14.33.

Example 8.—2-(o-chlorobenzyl)-1-methyl-1,4,5,6-tetrahydropyrimidine hydrochloride A solution of 44 grams (0.5 mole) of N-methyl-1,3-diamino-propane (J. Am. Chem. Soc. 68, 1217 [1946]) in 100 milliliters of isopropyl alcohol was combined with a solution of 190 grams (1 mole) of p-toluenesulfonic acid monohydrate in 100 milliliters of water and the solution was distilled to dryness. The residue was recrystallized twice from isopropyl alcohol. Yield of N-methyl-1,3-propanediamine bis-p-toluenesulfonate was 140 grams (65 percent), melting point 160–161 degrees centigrade.

*Analysis.*—Calculated for $C_{18}H_{28}N_2O_6S_2$: N, 6.48. Found: 6.36.

A mixture of 7.6 grams (0.05 mole) of o-chlorophenylacetonitrile, 13 grams (0.03 mole) of the bis-p-toluenesulfonate of N-methyl-1,3-diaminopropane and 3 grams (0.03 mole) of N-methyl-1,3-diaminopropane was heated at 200–210 degrees centigrade for 1.5 hours. The cooled mixture was dissolved in water, the solution was made alkaline and extracted with ether. The dried ether extract was acidified with ethereal hydrogen chloride and the precipitated hydrochloride salt was recrystallized from a mixture of isopropyl alcohol and ether. Yield, 2.5 grams of 2-(o-chlorobenzyl)-1-methyl-1,4,5,6-tetrahydropyrimidine hydrochloride as a water-soluble, white, crystalline solid, melting at 209–210 degrees centigrade.

*Analysis.*—Calculated for $C_{12}H_{15}ClN_2 \cdot HCl$: Cl⁻ 13.68. Found: 13.78.

Example 9.—2-(o-chloro-alpha-methylbenzyl)imidazoline hydrochloride

Following the procedures of Example 1, alpha-(ortho-chlorophenyl) propionitrile (see Example 11 for method of preparation) was reacted with ethylenediamine-mono-p-toluenesulfonate, to make 2-(o-chloro-alpha-methylbenzyl)imidazoline (melting point 104–105 degrees centigrade) which was then used to form the hydrochloride salt. Upon recrystallization from ethanol-ether, 2-(o-chloro-alpha-methylbenzyl)imidazoline hydrochloride was obtained as a water-soluble, white, crystalline solid, melting at 219–220 degrees centigrade.

*Analysis.*—Calculated for $C_{11}H_{13}ClN_2 \cdot HCl$: Cl⁻ 14.46. Found: 14.46.

Example 10.—1-methyl-2-(o-chlorobenzyl)imidazoline hydrochloride

Following the Example 8 procedure, o-chlorophenylacetonitrile was reacted with N-methyl ethylenediamine-bis-p-toluenesulfonate (J. Chem. Soc. 1950, 859) and N- methyl ethylenediamine to form the base, 1-methyl-2-(o-chlorobenzyl)imidazoline which boils at 122–124 degrees centigrade (1.1 millimeters), and from this was obtained 1-methyl-2-(o-chlorobenzyl)imidazoline hydrochloride which, after recrystallization from isopropyl alcohol-ether, was a water-soluble, white, crystalline, solid, melting at 185–186 degrees centigrade.

*Analysis.*—Calculated for $C_{11}H_{13}ClN_2 \cdot HCl$: $Cl^-$ 14.46. Found: 14.37.

*Example 11.—1-methyl-2-(o-chloro-alpha,alpha-dimethylbenzyl)imidazoline.*

To a cooled, stirred suspension of 11.7 grams (0.3 mole) of sodium amide in 100 milliliters of benzene was added slowly 45.6 grams (0.3 mole) of o-chlorophenylacetonitrile in 50 milliliters of benzene. The dark mixture was stirred 1 hour at room temperature after which it was treated dropwise with a solution of 45.5 grams (0.32 mole) of methyl iodide in 50 milliliters of benzene. The mixture was stirred under reflux for 2 hours, water was added and the layers separated. The benzene layer was fractionated to yield 30 grams (60 percent) of a colorless oil, boiling point 79–81 degrees centigrade (1.2) which was alpha-(o-chlorophenyl)propionitrile.

*Analysis.*—Calculated for $C_9H_8ClN$: N, 8.46. Found: 8.62.

The above alpha-(o-chlorophenyl)propionitrile was alkylated with methyl iodide in the manner just described to obtain a 70 percent yield of a colorless oil, boiling point 92–93 degrees centigrade (1.2 millimeters), which was alpha-(o-chlorophenyl)isobutyronitrile.

*Analysis.*—Calculated for $C_{10}H_{10}ClN$: N, 7.80. Found: 8.03.

A mixture of 7.2 grams (0.04 mole) of the above isobutyronitrile, 8.4 grams (0.02 mole) of N-methylethylenediamine bis-p-toluenesulfonate (J. Chem. Soc. 1950, 859) and 1.48 (0.02 mole) of N-methyl-ethylenediamine was heated at 200 degrees centigrade for 3 hours. The cooled mixture was dissolved in water, the solution was clarified by extraction with ether and made alkaline with sodium hydroxide. The liberated oily base was extracted with ether and the dried ether solution was distilled to obtain 1.9 grams of an oil, boiling point 134–135 degrees centigrade (1.4 millimeters). The distillate solidified and recrystallized as colorless crystals from heptane; melting point 62–64 degrees centigrade; was 1-methyl-2-(o-chloro-alpha, alpha-dimethylbenzyl)imidazoline.

*Analysis.*—Calculated for $C_{13}H_{17}ClN_2$: N, 11.84, neut. equiv. 237. Found: 12.03, 238.

*Example 12.—2-(o-chloro-alpha, alpha, dimethylbenzyl)-imidazoline hydrochloride*

Following the procedure of Example 1, alpha-(o-chlorophenyl)isobutyronitrile was reacted with ethylenediamine-mono-p-toluenesulfonate, and 2-(o-chloro-alpha, alpha-dimethylbenzyl)imidazoline was obtained as colorless needles which melted at 122–123 degrees centigrade after recrystallization from heptane.

*Analysis.*—Calculated for $C_{12}H_{15}ClN_2$: neut. equiv. 223. Found: 225.

The hydrochloride salt was prepared from the above base and hydrogen chloride in alcohol and melted at 224–225 degrees centigrade after recrystallization from ethanol-ether.

*Analysis.*—Calculated for $C_{12}H_{15}ClN_2 \cdot HCl$: $Cl^-$ 13.67. Found: 13.65.

*Example 13.—2-(o-chloro-alpha-hydroxybenzyl)1-methyl-1,4,5,6-tetrahydropyrimidine sulfate*

A solution of 26 grams (0.155 mole) of o-chloromandelonitrile (J. Am. Chem. Soc., 55, 2593 (1933)) and 9.4 milliliters (0.155 mole) of ethanol in ether containing an excess of hydrogen chloride was allowed to remain overnight at room temperature whereupon the solid ester hydrochloride separated. Yield, of ethyl-o-chloro-mandelimidate hydrochloride was 20 grams; melting point 130 degrees centigrade (decomposition).

*Analysis.*—Calculated for $C_{10}H_{12}ClNO_2 \cdot HCl$: C- 14.17. Found: 14.16.

To a stirred solution of 7 grams (0.08 mole) of N-methyl-1,3-diaminopropane (J. Am. Chem. Soc. 68, 1217 (1946)) in 100 milliliters of ethanol at 5 degrees centigrade was added 20 grams (0.08 mole) of the imidic ester hydrochloride. After the mixture had been stirred for one hour at 5 degrees centigrade and one hour at 25 degrees centigrade, it became homogeneous and most of the alcohol was removed by vacuum distillation. The residual solution was acidified with ethanolic hydrogen chloride and distilled to an oil residue which was dissolved in water. The aqueous solution was made alkaline and extracted with ether. Removal of the ether left an oily base which almost completely solidified. A portion was recrystallized from heptane as large coarse needles, of 2-(o-chloro-alpha-hydroxybenzyl)-1-methyl-1,4,5,6-tetrahydropyrimidine which melted at 69–70 degrees centigrade.

*Analysis.*—Calculated for $C_{12}H_{15}ClN_2O$: neut. equiv., 239. Found: 240.

The 2-(o-chloro-alpha-hydroxybenzyl)-1-methyl-1,4,5,6-tetrahydropyrimidine sulfate salt was prepared from the above base and sulfuric acid in ether solution and was recrystallized from isopropyl alcohol, as long, coarse needles, melting point 183–184 degrees centigrade.

*Analysis.*—Calculated for $C_{12}H_{15}ClN_2O \cdot H_2SO_4$: N, 8.32. Found: 8.20.

*Example 14.—2-(o-chloro-alpha-methyl-alpha-propylbenzyl)imidazoline*

Alpha-(o-chlorophenyl)propionitrile was alkylated with propyl bromide according to the procedure previously described in Example 11. The yield of o-chloro-alpha-methyl-alpha-propylphenlacetonitrile, boiling point 103–104 degrees centigrade (1.3 millimeters), was 87 percent.

*Analysis.*—Calculated for $C_{12}H_{14}ClN$: N, 6.74. Found: 6.69.

A mixture of 7 grams (0.034 mole) of the o-chloro-alpha-methyl-alpha-propylphenylacetonitrile and 10.5 grams (0.045 mole) of ethylenediamine mono-p-toluenesulfonate (J. Chem. Soc., 1947, 497) was heated at 200–220 degrees centigrade for 4 hours, cooled and dissolved in dilute hydrochloric acid. The solution was extracted with ether and made alkaline with sodium hydroxide. The oil which separated was extracted with ether, the ether solution was dried and distilled to an oil which was dissolved in boiling heptane. The cooled solution deposited 2 grams of colorless needles which melted at 101–102 degrees centigrade after a subsequent recrystallization from heptane.

*Analysis.*—Calculated for $C_{14}H_{19}ClN_2$: N, 11.17 neut. equiv., 250. Found: 11.19, 251.

*Example 15.—2-(o-chlorobenzyl)-5-hydroxy-1,4,5,6-tetrahydropyrimidine hydrochloride*

A solution of 45 grams (0.5 mole) of commercial 1,3-diamino-2-propanol in 50 milliliters of isopropyl alcohol was combined with a solution of 190 grams of p-toluene sulfonic acid monohydrate (1 mole) in 100 milliliters of water and the resulting solution was distilled to dryness. The residue was recrystallized from isopropyl alcohol. Yield of 1,3-diamino-2-propanol bis-p-toluenesulfonate was 167 grams (77 percent); melting point 272–273 degrees centigrade after a subsequent recrystallization from isopropyl alcohol.

*Analysis.*—Calculated for $C_{17}H_{26}N_2O_7S_2$: N, 6.47. Found: 6.46.

A mixture of 7.6 grams (0.05 mole) of o-chlorophenylacetonitrile, 11.8 grams (0.027 mole) of 1,3-diamino-2-propanol bis-p-toluenesulfonate and 2.4 grams (0.027 mole) of 1,3-diamino-2-propanol was heated at 160–190 degrees centigrade until the evolution of ammonia had ceased (2 hours). The cooled reaction mixture was dissolved in ethanol and the solution was cooled, whereupon 11 grams of the mono-p-toluenesulfonate salt of 2-(o-chlorobenzyl) - 5 - hydroxy-1,4,5,6-tetrahydropyrimidine separated. It melted at 168–169 degrees centigrade after a subsequent recrystallization from ethanol.

Analysis.—Calculated for $C_{18}H_{21}ClN_2O_4S$: N, 7.04. Found: 6.90.

The 2 - (o - chlorobenzyl)-5-hydroxy-1,4,5,6-tetrahydropyrimidine base was obtained by alkalizing an aqueous solution of the mono-p-toluenesulfonate with dilute sodium hydroxide. The base separated as tiny white needles, melting point 157–158 degrees centigrade, and may be recrystallized from water.

Analysis.—Calculated for $C_{11}H_{13}ClN_2O$: neut. equiv., 225. Found: 225.

The 2-(o-chlorobenzyl)-5-hydroxy-1,4,5,6-tetrahydropyrimidine hydrochloride was prepared in ethanolic hydrogen chloride and precipitated by the addition of ether. It is a water-soluble, white crystalline solid, melting point 212–214 degrees centigrade.

Analysis.—Calculated for $C_{11}H_{13}ClN_2O \cdot HCl$: C–13.58. Found: 13.61.

*Example 16.—2-(o-chlorobenzyl)-4-methyl-1,4,5,6-tetrahydropyrimidine hydrochloride*

A solution of 26 grams (0.3 mole) of commercial 1,3-diaminobutane in 40 milliliters of isopropanol was combined with a solution of 114 grams (0.6 mole) of p-toluenesulfonic acid monohydrate in 80 milliliters of water. The solution was distilled to near dryness and the residue was recrystallized from isopropyl alcohol. Yield, of 1,3-diaminobutane bis-p-toluenesulfonate was 108 grams; melting point 190–191 degrees centigrade.

Analysis.—Calculated for $C_{18}H_{28}N_2O_6S_2$: N, 6.48. Found: 6.72.

A mixture of 5 grams (0.033 mole) of o-chlorophenyl-acetonitrile, 7.4 grams (0.017 mole) of 1,3-diaminobutane bis-p-toluene-sulfonate and 1.5 grams (0.017 mole) of commercial 1,3-diaminobutane was heated at 200–210 degrees centigrade for 2 hours. The cooled mass was dissolved in dilute hydrochloric acid and made strongly alkaline to liberate the oily base which was extracted with ether and distilled. A viscous oil (1.9 grams) distilled at approximately 141 degrees centigrade (0.8 millimeter), and was dissolved in ether and acidified with ethereal hydrogen chloride. The solid which separated was recrystallized from an isopropyl alcohol-ether mixture, as colorless crystals of 2-(o-chlorobenzyl)-4-methyl-1,4,5,6-tetrahydropyrimidine hydrochloride melting at 173–174 degrees centigrade.

Analysis.—Calculated for $C_{12}H_{15}ClN_2 \cdot HCl$: Cl,– 13.68. Found: 13.64.

In a manner similar to the above, other compounds within the scope of this invention can be prepared by varying the halogen in the particular ortho-halophenyl-acetonitrile employed e.g. in Examples 7, 8 in place of o-chlorophenylacetonitrile, the o-brom, o-iodo, o-fluoro, o, p-dichlor, et cetera, salts could be employed; and by also varying the substituents on the alpha carbon of the ortho-halophenylacetonitrile employed e.g., using the alpha-methyl; alpha-butyl; alpha-ethyl, alpha-butyl acetonitrile, et cetera. The amine reactant can be varied also e.g. where the imidazoline is desired, ethylenediamine-mono-p-toluene-sulfonate is employed; where the tetrahydropyrimidine is desired, the 1,3-diaminopropane salt is employed, or the imidazoline and tetrahydropyrimidine rings can be lower-alkyl substituted or hydroxy-substituted by using correspondingly substituted diamine reactants having 2 or 3 carbons between the two nitrogens.

The type of pharmacological activity of the compounds of the present invention may be illustrated by that of the compound of Example 1, 2-(o-chlorobenzyl)imidazoline hydrochloride, whose activity was: Toxicity: $LD_{50}$ (24 hours) in mice was 125±4 mg./kg. on intraperitoneal injection; oral $LD_{50}$ in mice was 336±9.1 mg./kg. Rats were able to tolerate much larger doses, with some survival noted with a dose of 1.6 grams/kg. Dogs also tolerated large doses, although as little as 2 mg./kg., intraduodenally, has a significant, rapid and lasting adrenolytic effect.

Adrenolytic action: In dogs narcotized with pentobarbital, intravenous administration of 2.5–5 mg./kg. of compound causes a complete adrenolytic effect within a few minutes. Intraduodenal administration of 5 mg./kg. is equally effective within 15–20 minutes. By either route, the adrenolytic action lasts for as long as 18 hours.

The pressor response to epinephrine is abolished, or, usually, reversed by these doses of compound in dogs.

The pressor response to norepinephrine is usually not completely abolished by the compound in the dog, but is always markedly reduced. Even gross doses of norepinephrine, 50 mg./kg., have only a slight pressor effect after compound has been given.

Antagonism of toxicity of epinephrine: Certain dosages of compound are capable of modifying the toxicity of epinephrine HCl in mice. The following table summarizes results obtained when varying dosages of compound were administered intraperitoneally to mice 20 minutes before the intravenous administration of 10 mg./kg. of epinephrine HCl.

| Dose of 2-(o-chlorobenzyl) imidazoline hydrochloride | Deaths in 18 hours |
|---|---|
| Controls | 20/25 |
| 5 mg./kg. | 3/20 |
| 10 mg./kg. | 0/20 |
| 20 mg./kg. | 1/20 |
| Priscoline HCl, 5 mg./kg. mol. equiv. of compound | 5/20 |

Following intravenous, subcutaneous and oral administration of the 2-chloro-benzylimidazoline hydrochloride, the blood pressure of the anesthesized dog does not rise or fall, whereas in comparable doses of benzylimidazoline, there was a lowering of blood pressure, and in some instances a rise of blood pressure.

Oral administration (or intraduodenal) into the anesthesized dog of 5 mg./kg. of 2 chloro-benzylimidazoline hydrochloride abolishes the pressor effect of both epinephrine and levo-arterenol for as long as 12 hours, or even longer. Administration of benzylimidazoline by the same route and in doses of 5 mg./kg. exerts adrenolytic activity for a much shorter period of time (5 to 6 hours) and little or no sympatholytic activity (anti-levo-arterenol). In the various experiments in which benzyl-imidazoline has been investigated, a depressor or pressor action was noted following its ingestion.

Benzylimidazoline produces tachycardia and peripheral dilatation. These effects are not abolished by atropine or atropine-like drugs. The 2-chloro-benzylimidazoline hydrochloride produces bradycardia when given in large doses. This bradycardia is abolished by atropine and atropine-like drugs.

Benzylimidazoline has a strong histamine-like effect on the smooth muscles. The chloro-benzylimidazoline has approximately one-twentieth the histamine-like effect of the non-halogenated compound.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2-(o-chlorobenzyl)imidazoline hydrochloride
2. 2-(o-chloro-alpha-methylbenzyl)imidazoline hydrochloride.
3. 1-methyl-2-(o-chloro-alpha, alpha-dimethylbenzyl) imidazoline.
4. 2-(2,6-dichlorobenzyl)imidazoline hydrochloride.

5. 2 - (o - chlorobenzyl) - 5 - hydroxy - 1,4,5,6 - tetrahydropyrimidine hydrochloride.

6. 2 - (o - chloro - alpha - hydroxybenzyl) - 1 - methyl-1,4,5,6-tetrahydropyrimidine sulfate.

7. A compound selected from the group consisting of (A) those having the following structural formula:

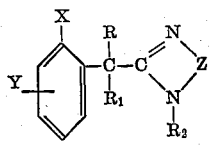

wherein X is a halogen atom; Y is selected from the group consisting of hydrogen and a halogen atom; R is selected from the group consisting of hydrogen, lower-alkyl, and hydroxy; $R_1$ and $R_2$ are each selected from the group consisting of hydrogen and lower alkyl; Z is selected from the group consisting of $-CH_2CH_2-$, $-CH_2CH_2CH_2-$, $-CH_2CH(OH)CH_2-$, and $-CH(CH_3)CH_2CH_2-$; and (B) non-toxic acid addition salts thereof.

8. 2-(o-chloro-alpha, alpha-dimethylbenzyl) imidazoline hydrochloride.

9. 2 - (o - chloro - alpha - methyl - alpha - propyl-benzyl) imidazoline.

References Cited in the file of this patent

FOREIGN PATENTS 596,663    Great Britain _____ Jan. 8, 1948

OTHER REFERENCES

Scholz: Industrial and Engineering Chemistry, vol. 37, pp. 120–125 (1945).

UNITED STATES PATENT OFFICE
CERTIFICATE OF CORRECTION

Patent No. 2,919,274                                December 29, 1959

John A. Faust et al.

It is hereby certified that error appears in the printed specification of the above numbered patent requiring correction and that the said Letters Patent should read as corrected below.

Column 3, line 64, for "ride", italicized, read -- Example 5: 2-(o-Fluorobenzyl)imidazoline Hydrochloride --, italicized; column 4, line 20, for the numeral "947" read -- 497 --.

Signed and sealed this 6th day of September 1960.

(SEAL)
Attest:

ERNEST W. SWIDER
Attesting Officer

ROBERT C. WATSON
                                                             Commissioner of Patents